(12) United States Patent
Colombo et al.

(10) Patent No.: US 7,270,163 B2
(45) Date of Patent: Sep. 18, 2007

(54) TYRE FOR A VEHICLE WHEEL INCLUDING SPECIFIC TREAD PATTERNS

(75) Inventors: Gianfranco Colombo, Concorrezzo (IT); Mario Isola, Milan (IT)

(73) Assignee: Pirelli Pneumatici S.p.A., Milan (IT)

(*) Notice: Subject to any disclaimer, the term of this patent is extended or adjusted under 35 U.S.C. 154(b) by 236 days.

(21) Appl. No.: 10/469,026

(22) PCT Filed: Feb. 18, 2002

(86) PCT No.: PCT/EP02/01691

§ 371 (c)(1),
(2), (4) Date: Jan. 23, 2004

(87) PCT Pub. No.: WO02/068221

PCT Pub. Date: Sep. 6, 2002

(65) Prior Publication Data

US 2004/0134580 A1    Jul. 15, 2004

Related U.S. Application Data

(60) Provisional application No. 60/279,431, filed on Mar. 29, 2001.

(30) Foreign Application Priority Data

Feb. 28, 2001  (EP) ................................ 018301440

(51) Int. Cl.
*B60C 11/11* (2006.01)
*B60C 11/12* (2006.01)
*B60C 11/13* (2006.01)

(52) U.S. Cl. .......................... 152/209.18; 152/209.21; 152/209.28; 152/DIG. 3

(58) Field of Classification Search ............. 152/209.1, 152/209.18, 209.21, 209.28, 902, DIG. 3, 152/903
See application file for complete search history.

(56) References Cited

U.S. PATENT DOCUMENTS 4,279,283 A * 7/1981 Hitzky ....................... 152/902

(Continued)

FOREIGN PATENT DOCUMENTS

DE          4319713      * 12/1994

(Continued)

OTHER PUBLICATIONS translation for Japan 4-274907 (translated Nov. 2006).*

(Continued)

*Primary Examiner*—Steven D. Maki
(74) *Attorney, Agent, or Firm*—Finnegan, Henderson, Farabow, Garrett & Dunner, L.L.P.

(57) ABSTRACT

A tire for a vehicle wheel includes a carcass structure, a belt structure associated coaxially with the carcass structure, and a tread band extending coaxially around the belt structure. The tread band includes a relief pattern including at least one row of blocks separated by transverse grooves intersecting two circumferential grooves. Each block of the at least one row is essentially delimited by two longitudinal sides in a circumferential direction of the tire and two transverse sides with respect to a predetermined rolling direction of the tire. Each block of the at least one row is formed by two axially-adjacent block portions. The transverse sides of each block portion include at least two successive curvilinear portions shaped differently from each other. The transverse grooves include two branches, each branch including a widened cross-section of substantially-curvilinear shape disposed in an area substantially equidistant from ends of a respective branch.

46 Claims, 4 Drawing Sheets

U.S. PATENT DOCUMENTS

| | | | |
|---|---|---|---|
| 5,088,536 A * | 2/1992 | Graas et al. | 152/902 |
| 5,198,047 A * | 3/1993 | Graas et al. | 152/209.18 |
| 5,301,727 A * | 4/1994 | Inoue | 152/DIG. 3 |
| 5,373,882 A * | 12/1994 | Nakagawa | 152/209.28 |
| 5,435,366 A * | 7/1995 | Voigt et al. | 152/209.18 |
| 5,759,313 A | 6/1998 | Shirai et al. | |
| 5,924,464 A * | 7/1999 | White | 152/209.21 |
| 6,003,574 A * | 12/1999 | Boiocchi et al. | 152/209.18 |
| 6,129,127 A * | 10/2000 | Nicotina | 152/209.18 |
| 6,378,583 B1 * | 4/2002 | Fontaine | 152/209.18 |
| 6,571,844 B1 * | 6/2003 | Ochi et al. | 152/DIG. 3 |
| 2004/0112494 A1 * | 6/2004 | Colombo et al. | 152/209.18 |

FOREIGN PATENT DOCUMENTS

| | | | |
|---|---|---|---|
| EP | 0 485 883 A1 | | 5/1992 |
| EP | 0 773 116 A1 | | 5/1997 |
| GB | 460338 | * | 1/1937 |
| JP | 60-45404 | * | 3/1985 |
| JP | 62-26105 | * | 2/1987 |
| JP | 63-301109 | * | 12/1988 |
| JP | 1-95912 | * | 4/1989 |
| JP | 2-99409 | * | 4/1990 |
| JP | 2-182505 | * | 7/1990 |
| JP | 4-274907 | * | 9/1992 |
| JP | 10-006714 | * | 1/1998 |

OTHER PUBLICATIONS

Bielefeld, "Richtungsgebundene, Pfeilreifen Fuer Die Golf-Klasse", Gummi Bereifung, vol. 68, No. 3, pp. 71-73, (1992).

W. Nobuo, "Pneumatic Tire", Patent Abstracts of Japan of JP 06305308, Nov. 1, 1994.

H. Toshio, "Motorcycle Belted Tire Excellent in Grounding Characteristic", Patent Abstracts of Japan of JP 61036002, Feb. 20, 1986.

* cited by examiner

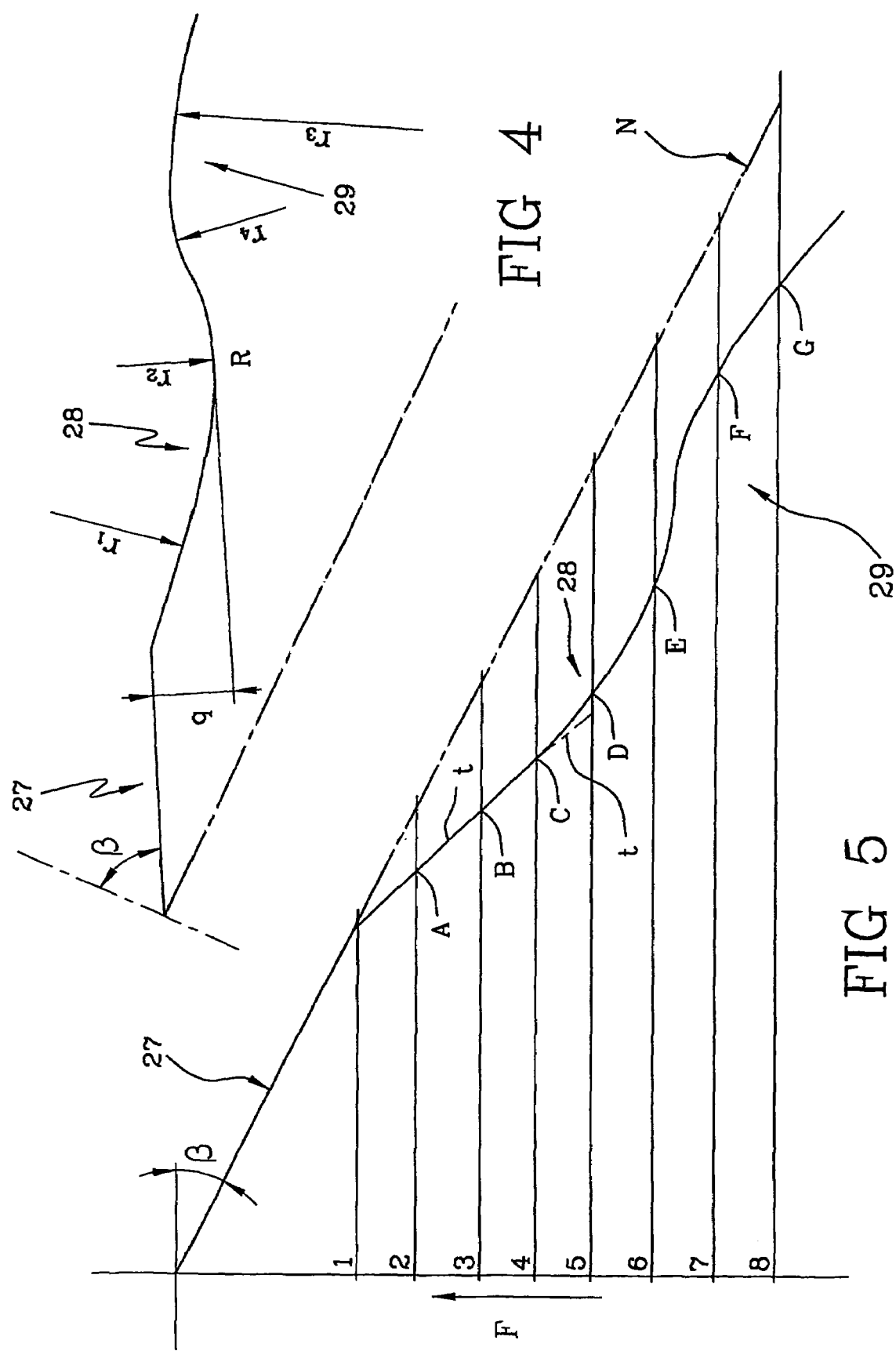

TYRE FOR A VEHICLE WHEEL INCLUDING SPECIFIC TREAD PATTERNS

CROSS-REFERENCE TO RELATED APPLICATIONS

This application is a national-phase entry under 35 U.S.C. § 371 from International Application No. PCT/EP02/01691, filed Feb. 18, 2002, in the European Patent Office, the contents of which are relied upon and incorporated herein by reference; additionally, Applicants claim the right of priority under 35 U.S.C. § 119(a)-(d) based on patent application No. 01830144.0, filed Feb. 28, 2001, in the European Patent Office; further, Applicants claim the benefit under 35 U.S.C. § 119(e) based on provisional application No. 60/279,431, filed Mar. 29, 2001, in the U.S. Patent and Trademark Office.

BACKGROUND OF THE INVENTION

1. Field of the Invention

The present invention relates to tyres for motor vehicles, particularly directional tyres for use on snow-covered ground.

2. Description of the Related Art

A tyre, in its most general form, comprises: a carcass structure including a central crown portion and two axially opposing sidewalls terminating in a pair of beads for securing the tyre to a wheel rim, a belt structure associated coaxially with the carcass structure and a tread band extending coaxially around the belt structure.

The tread band is generally moulded with a relief pattern formed by a plurality of longitudinal and transverse grooves which, in combination, give rise to a plurality of blocks distributed according to different types of configurations, for example along a central area extending across the equatorial plane and in at least two shoulder areas extending in axially opposed positions on either side of said central area.

Of particular importance for the purposes of travel on a snow-covered surface is the presence, in the blocks, of suitable sipes, in other words of a closely spaced set of incisions or small grooves which are circumferentially distributed and orientated essentially transversely with respect to the rolling direction. The function of said sipes is essentially to collect and retain the snow in an efficient way, since it has been shown to be generally convenient to exploit the friction of snow on snow to ensure a good grip of a tyre on snow-covered ground.

One type of winter tyre marketed by the Applicant has, in the tread band, a pair of rectilinear circumferential grooves, arranged symmetrically with respect to the equatorial plane of the tyre and spaced apart from each other by a distance essentially equal to half of the total width of the tread band.

Said circumferential grooves are combined with two sets of transverse grooves, each of which extends with a progressively increasing inclination from the outer edge of the tread band to a point on the equatorial plane.

The transverse grooves of said two sets converge symmetrically on the equatorial plane of the tyre in a predetermined preferred rolling direction, and have their vertices interleaved with each other alternately along the perimetric extension of the tread band in correspondence of the equatorial plane.

In said tread band, the configuration of the transverse grooves is such as to promote good characteristics of traction because of the mutual convergence of the grooves in the rolling direction.

Moreover, the circumferential rectilinear grooves enable water to be removed efficiently from the footprint while the tyre is running on a wet surface, thus preventing the onset of the well-known and dangerous phenomenon of aquaplaning.

The traction and the overall behavior in travel on a snow-covered surface are improved by the provision of closely spaced sipes in the blocks obtained by the intersection of the longitudinal grooves with the transverse ones, and by suitable rectilinear grooves, associated with the transverse grooves, in the space delimited by the two circumferential grooves, each of said rectilinear grooves extending in the circumferential direction for a short distance from the corresponding transverse groove.

Patent EP-773,116, in the name of the same Applicant, discloses a tyre for snow-covered surfaces, provided with a tread band in which the circumferential grooves are formed by a sequence of portions orientated obliquely with respect to the circumferential direction of the tyre. Said oblique portions converge symmetrically towards the equatorial plane according to a direction opposite to the direction of convergence of the transverse grooves.

Each of the oblique portions of the circumferential grooves extends between two consecutive transverse grooves and delimits respectively the opposing circumferential edges of a centre block and of a shoulder block.

In this solution, each of the centre and shoulder blocks has a corner projecting into the inside of the corresponding circumferential groove with respect to the opposite corner of the block immediately following it.

In this situation, the projecting corners of the centre blocks act as teeth which provide the grip on snow in traction, while the projecting corners of the shoulder blocks produce this effect during braking.

In order to increase the grip on snow, said tyre also has a groove of trapezoidal shape extending partially between two adjacent blocks belonging to the same row of centre blocks.

Said groove passes through the transverse groove between the two centre blocks and has an inner circumferential edge and an outer circumferential edge which diverge from each other at angles preferably comprised from 3° to 15°, in the opposite direction to the rolling direction.

However, since the tread pattern for a tyre suitable for running on snow-covered ground has a considerable number of blocks, it inevitably causes a certain degree of noise when running on dry roads because of the successive impacts of the frontal profiles of the blocks on the ground.

U.S. Pat. No. 5,759,313 relates to a pneumatic tyre permitting a vehicle to travel excellently both in the on-road condition and in the off-road condition without changing its tyres. To achieve such an object, the document discloses a tyre, wherein sub-grooves extending at least in the widthwise direction of the tyre are arranged in the circumferential direction thereof at a predetermined pitch in a center portion of a tread surface and in shoulder portions thereof on both sides of the center portion. Both the width and depth of the sub-grooves in both of the shoulder portions are set larger than those of the sub-grooves in the center portion. A ratio of the area of the sub-grooves in both of the shoulder portions to that of the tread surface is set larger than a ratio of the area of the sub-grooves in the center portion to that of the tread surface.

In considering the cited prior art, the Applicant has perceived the necessity of providing a tyre for snow-covered ground which can simultaneously ensure a good grip on said type of ground, a satisfactory noiseness when running on dry roads, and a high wear-resistance of the tread blocks.

SUMMARY OF THE INVENTION

The Applicant has found that said performances can be achieved by using profiles of the frontal sides of adjacent blocks, belonging to the same row, which are such as to produce, when combined in pairs, gripping means with an undulated profile, together with variations of said profiles, in order to attenuate the impact of each block on the ground in conditions of rolling on a dry surface.

Therefore, according to a first aspect the present invention concerns a winter tyre for vehicle wheels, comprising: a carcass structure including a central crown portion and two axially opposing sidewalls; a belt structure associated coaxially with the carcass structure; and a tread band extending coaxially around the belt structure, moulded with a relief pattern which comprises at least one row of blocks separated by transverse grooves intersecting two lateral circumferential grooves.

Each block of said at least one row of blocks is essentially delimited by two longitudinal sides in the circumferential direction and by two transverse sides, also referred to as "frontal profiles" in the following text, respectively one at the front and one at the rear with respect to a predetermined rolling direction.

The principal characteristics of the tread band according to the invention are as follows:
a) said blocks are formed of two portions axially adjacent with respect to a longitudinal axis;
b) said transverse grooves between two circumferentially adjacent blocks are provided with a widening of the cross section, said widening having an essentially curvilinear profile in at least one of said two axially adjacent portions; said widenings of the cross section between blocks being intended to trap the snow;
c) the facing frontal profiles of circumferentially adjacent blocks are formed by at least two successive curvilinear portions which are different from each other, to form means of attenuating the noise originating from the contact of the tread band with the ground during the travel of the tyre.

The term "longitudinal axis" denotes an axis parallel to or possibly aligned with the equatorial plane of the tyre.

According to a preferred embodiment of the invention, all the blocks of said at least one row of blocks are shaped in the same way.

Preferably, said two curvilinear portions follow each other axially in the frontal profile of a first portion of a first block with a sequence which is the inverse of that present in the corresponding frontal profile of the other, axially adjacent, portion of said first block. Preferably, said curvilinear portions follow each other axially in the frontal profile of the two axially adjacent portions of a first block with a sequence which is the inverse of that present in the facing frontal profile of the two corresponding axially adjacent portions of a second block which is circumferentially adjacent to the first.

Preferably, the frontal profile of each portion of the blocks comprises a first rectilinear portion followed by said two curvilinear portions.

Preferably, said two curvilinear portions are formed by a first curvilinear portion which is concave towards the inside of the block and by a second curvilinear portion having a curvature opposite to that of the first portion.

Preferably, the axially adjacent portions of the blocks of said at least one row of blocks are respectively contained in two axially adjacent rows of imaginary parallelograms in which:

the longitudinal sides of said parallelograms are parallel to the equatorial plane of the tyre and partially coincide with the longitudinal sides of the blocks;

the transverse sides of the parallelograms of each row are parallel to each other, converge towards the equatorial plane and partially coincide with the transverse sides of the blocks;

the ratio between the minor diagonal and the major diagonal of said parallelograms is preferably in the range from 0.50 to 0.70.

Preferably, each of the two adjacent portions of said blocks is essentially in the shape of an irregular rhombus, with the major diagonal inclined with respect to the equatorial plane at an angle in the range from 25° to 55°.

Preferably, said two portions of each block are joined together along the adjacent longitudinal side.

Preferably, at least one of the two frontal profiles of each block has a concavity located in a central position, in other words extending essentially across the equatorial plane of the tyre.

Said concavity advantageously forms a further means by which the tread band according to the invention can trap snow and, therefore, as stated above, provide an grip of the tyre when running on snow-covered ground.

In a preferred embodiment of the invention, the tread band comprises a centre row of blocks, located across the equatorial plane and contained between two circumferential grooves, and two lateral rows of blocks, formed between said two circumferential grooves and the edges of the tread band.

Each block of the centre row, as mentioned above, comprises the aforesaid two axially-adjacent portions joined together in correspondence of a longitudinal axis passing through the centre of the block.

The blocks of said lateral rows, also called shoulder blocks, can have various shapes. Said shapes can be identical to those of the blocks of the centre row or can have polygonal shapes different from those of the centre blocks.

Preferably, the tread pattern present on one side of the equatorial plane is a mirror image of that present on the other side.

In a preferred embodiment of the invention, curvilinear profiles of the centre blocks and of the lateral blocks face each other and are opposed to each other along the circumferential grooves. Said opposing curvilinear profiles cause the formation of a widening of the circumferential groove which can trap the snow more efficiently, with the advantages described above.

Preferably, each of the centre and shoulder blocks has a plurality of sipes in it.

Further characteristics and advantages will be made clearer by the following description of an example of a preferred embodiment of a tyre according to the invention, provided for guidance and without restrictive intent, with reference to the attached drawings, in which:

BRIEF DESCRIPTION OF THE DRAWINGS

FIG. 4 shows some details of a block illustrated in the partial plan view of FIG. 2;

FIG. 5 shows a comparison between portions of the profile of a block according to the invention and corresponding portions of the profile of a known block.

DETAILED DESCRIPTION OF THE EMBODIMENTS

Figure 1:
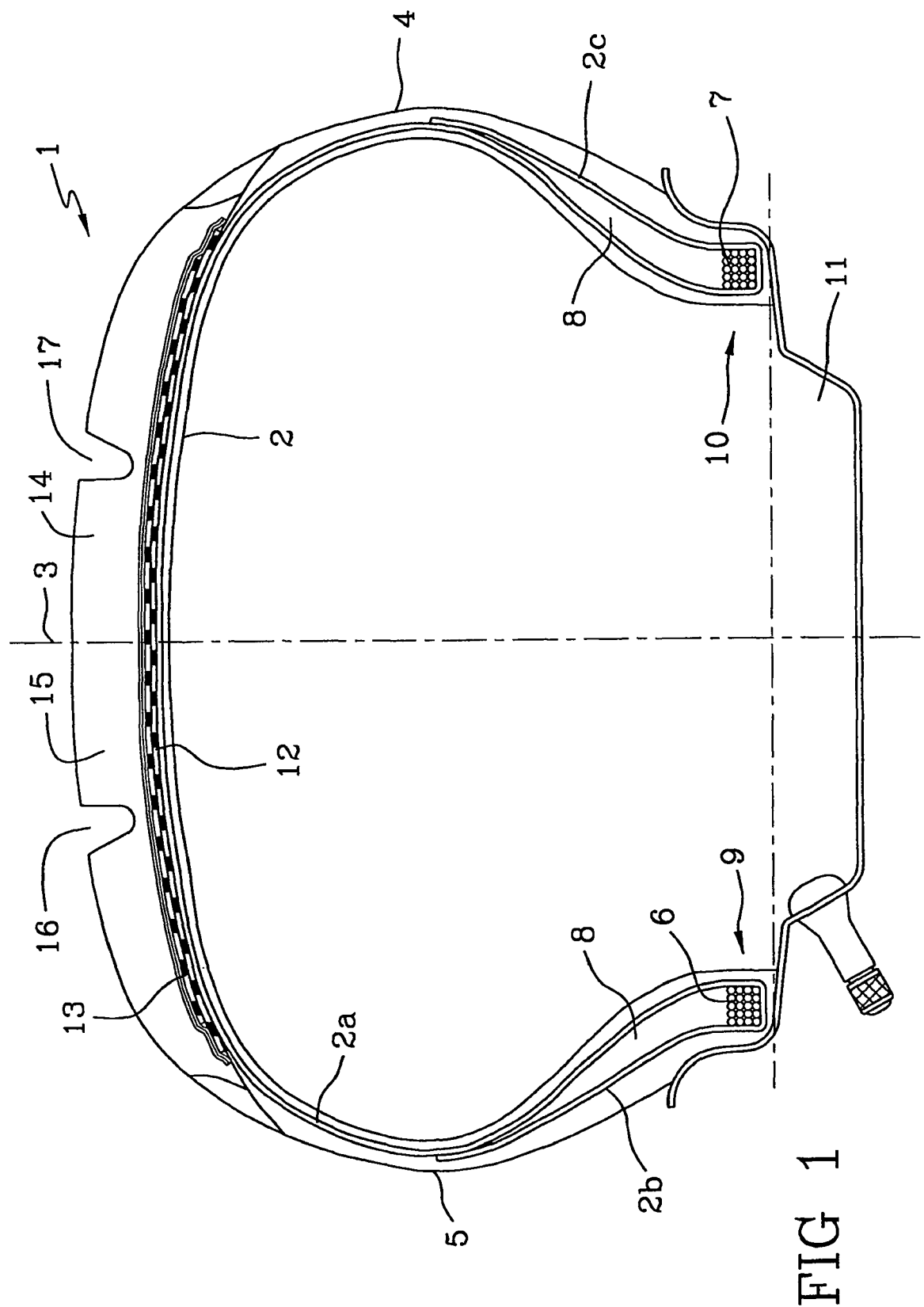
FIG. 1 shows a partial cross-sectional view of a tyre according to the invention.

With reference to FIG. 1, reference sign 1 indicates in a general way a tyre for motor vehicles according to the invention, for example a tyre of the 155/70 R13 size.

The tyre 1 comprises a carcass structure 2, including a central crown portion 3 and two sidewalls 4, 5, said carcass structure 2 being provided with a reinforcing ply 2a whose opposite ends 2b, 2c are wound around corresponding bead cores 6, 7.

An elastomeric filler 8 is applied to the radially outer perimetric edge of the bead cores 6, 7 which are located at the radially inner edges of said sidewalls 4, 5, said elastomeric filler being positioned in the space formed between the reinforcing ply 2a and the corresponding ends 2b, 2c of said reinforcing ply 2a.

As is known, the opposing areas of the tyre 1, each comprising a bead core 6, 7 and the filler 8, form what are known as beads, indicated as a whole by 9 and 10, intended to secure the tyre 1 on a corresponding mounting rim 11 of the wheel of a vehicle.

A belt structure 12, comprising one or more reinforcing strips 13 made from textile or metal cords incorporated in a specified mixture, is associated coaxially with the aforesaid carcass structure 2.

Figure 2:
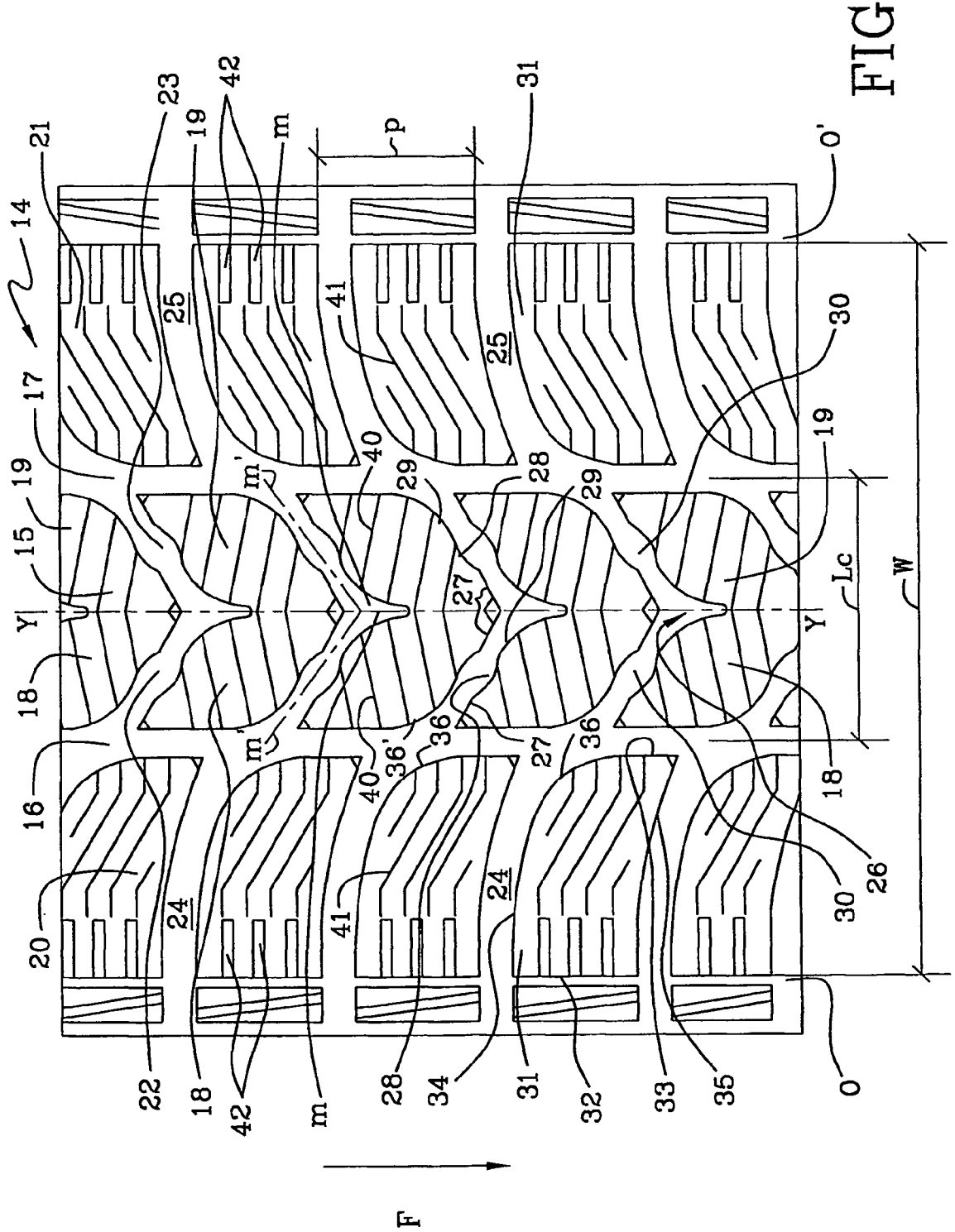
FIG. 2 shows a development, in plan view from the top, of the tread band of the tyre of FIG. 1.

A tread band 14, in the thickness of which a pattern shown in more detail in FIG. 2 is cut, is applied in a known way to the belt structure 12.

The tread band 14 according to the invention is particularly suitable for snow-covered surfaces.

As shown in FIG. 2, the tread band 14 comprises a central row 15 of blocks axially delimited between two circumferential grooves 16, 17.

The centre row 15 comprises blocks, each of which is formed by two portions 18, 19 which are axially adjacent to each other on a longitudinal axis which, in the illustrated embodiment, belongs to the equatorial plane Y-Y of the tyre.

Said tread band 14 also comprises two rows of shoulder blocks 20, 21, located on opposite sides of the centre row 15. Additionally, the blocks of the shoulder rows 20, 21 are delimited externally in the axial direction by the shoulder disconnection grooves O, O' of the tread band 14.

The transverse grooves of the centre row 15 have two branches 22, 23 whose mid-line axes m-m' converge towards the equatorial plane with an inclination lying in the rolling direction of the tyre which is indicated by the arrow H in FIG. 2.

Said transverse grooves of the centre row 15 intersect the circumferential grooves 16, 17 and continue to form the transverse grooves 24 and 25 of the shoulder rows 20 and 21 respectively.

Preferably, the circumferential grooves 16, 17 have midline axes parallel to the equatorial plane. Preferably, said grooves have a depth in the range from 6 to 12 mm. The width of the circumferential grooves 16, 17 is preferably in the range from 4 to 8 mm.

Preferably, the transverse grooves 22-25 have a depth in the range from 4 to 12 mm. Preferably, they have a width in the range from 3 to 6 mm.

Preferably, both the transverse and the circumferential grooves have the same depth, for example of 8 mm.

As clearly shown in FIG. 2, the portion of the tread band 14 located on the left of the equatorial plane Y-Y is a mirror image of the part located on the right of said equatorial plane.

Each block of the tread band according to the invention comprises two longitudinal sides and two transverse sides, respectively the front side and the rear side, with respect to the direction of travel.

Each block of the centre row 15 is formed by at least two portions 18, 19 which are axially adjacent with respect to a longitudinal axis; each portion has an irregular rhomboidal shape.

Figure 3:
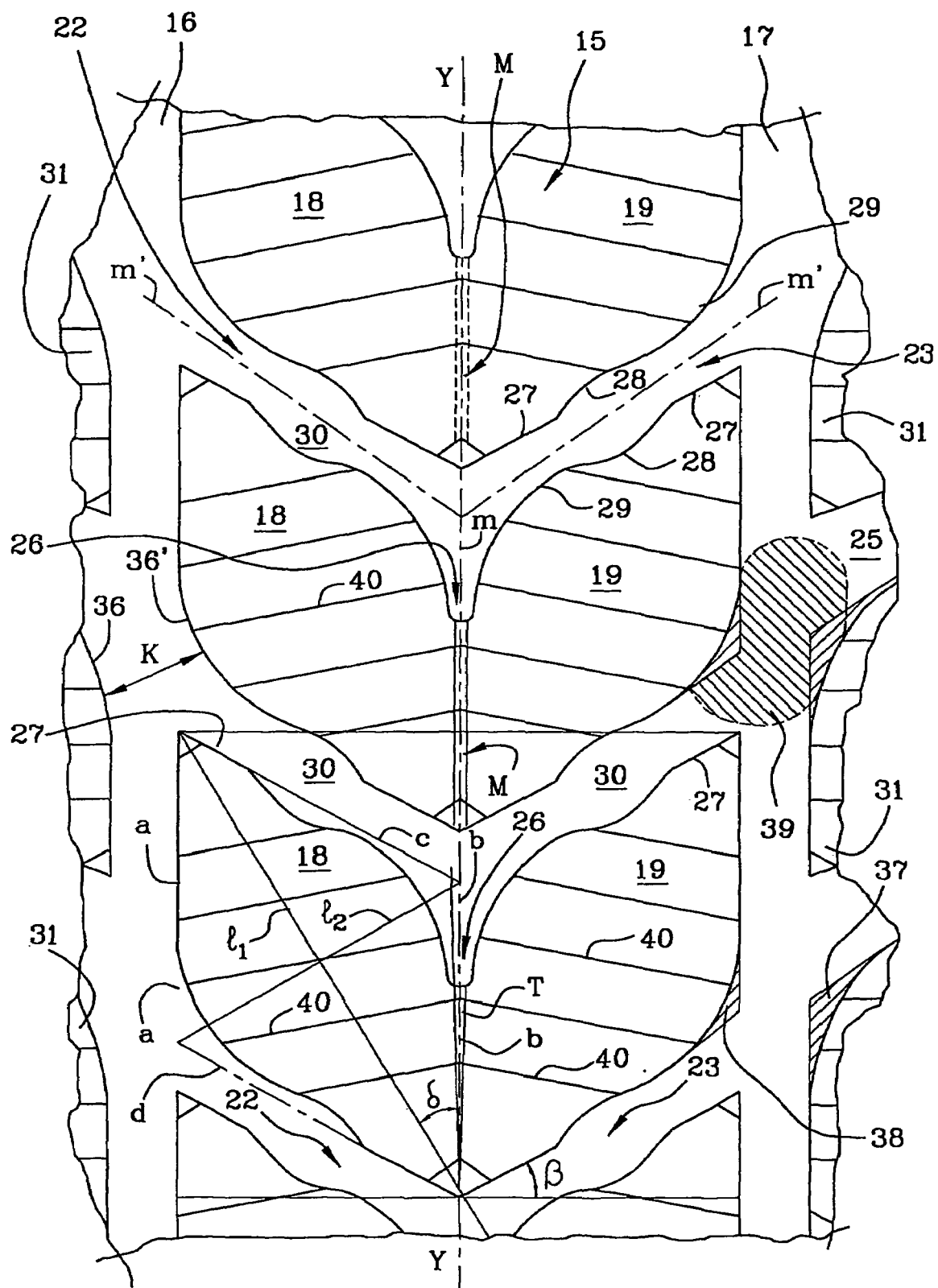
FIG. 3 shows an enlargement of a portion of FIG. 2.

In greater detail, as shown in FIG. 3, each portion 18, 19 of a block of the centre row 15 is contained in a regular parallelogram formed by a pair of longitudinal sides "a", "b", parallel to the equatorial plane, and by a pair of transverse sides "c", "d", inclined at equal angles with respect to the equatorial plane. Said parallelogram has a pair of diagonals $l_1$, $l_2$.

The two parallelograms delimiting each block of the centre row have in common the side "b" aligned along the equatorial plane.

Each portion 18, 19 of the block 15 departs from the aforesaid parallelogram in the following ways:

the axially outer longitudinal side of each portion of the block is aligned with the outer side "a" of the parallelogram and its length is lower than "a". Preferably, the length of the axially outer longitudinal side of each portion of the block does not exceed 75% of the length of "a";

the axially-inner longitudinal side of each portion of the block is aligned with the side "b" of the parallelogram and has a length substantially equal to that of the axially-outer longitudinal side;

the transverse sides of each portion of the block have a portion of predetermined length, preferably not exceeding 35% of the length of "c", in common with the transverse sides of the parallelogram;

the maximum extension of each portion of the block is equal to the longer diagonal $l_1$ of the parallelogram; preferably, said diagonal $l_1$ is inclined with respect to the equatorial plane at an angle δ whose value is in the range from 25° to 55°; preferably, said value does not exceed 45°;

the maximum transverse dimension of each portion of the block is smaller than the length of the shorter diagonal 12 of the parallelogram. Preferably, said maximum transverse dimension of each portion of the block is not greater than 75% of $l_2$;

the overall shape of each portion of block is a sharp ovoid shape, similar to that of a leaf, inscribed in a parallelogram in which the ratio $l_2/l_1$ between the smaller diagonal and the longer diagonal is preferably in the range from 0.50 to 0.70.

It was stated above that the axially inner longitudinal sides of the two portions of block are aligned along the central longitudinal axis of the block (in the described example they are aligned on the equatorial plane). However, it should be noted that, for the purposes of the present invention, the block 15 is considered to be a single block both when it comprises two separate axially adjacent portions separated by a sipe and when, alternatively, block 15 is formed by the aforesaid two separate portions joined together along their axially inner longitudinal side which is common to both of said portions.

In the case of separate portions, the depth of the separating sipe is preferably in the range from 4 to 12 mm. Preferably, the width of said sipe does not exceed 2 mm.

In particular, it should be noted that, regardless of the configuration used, the two axially adjacent portions of each centre block, joined together in this way, form, at least on one of the two frontal profiles of the block, a concavity 26 defined below in greater detail.

Advantageously, the shape and dimensions of the centre block 15 help to provide the block with sufficient deformability to give it advantageous properties of adaptation to particularly rough grounds.

It should be noted that the frontal profiles of both the adjacent portions of each centre block have a particular configuration which comprises at least three distinct portions, all three being shaped differently from each other.

For example, the enlargement of FIG. 3 shows that the frontal profile of each portion 18, 19 of the centre block comprises a first rectilinear portion 27 and two successive curvilinear portions 28, 29, one being concave and the other convex towards the outside.

Preferably, said curvilinear portions are parabolic and/or circular arcs.

As shown in FIGS. 3 and 4, the first rectilinear portion 27 is inclined with respect to a plane perpendicular to the equatorial plane at an angle β whose value is in the range from 20° to 35°.

Preferably, the first and the second curvilinear portions are both shaped in the form of successive portions of circular arcs.

More precisely, the first curvilinear portion 28 comprises two circular arcs, having a first and second radius $r_1$, $r_2$, while the second curvilinear portion 29 comprises a third circular arc with a radius $r_3$ linked to said second circular arc by a fourth circular arc with a radius $r_4$.

Preferably, the configuration of the frontal profile of a portion of the block has the following additional characteristics:

the ratio between the radii $r_1$ and $r_2$ of the first and second circular arcs is in the range from 1 to 6;

the ratio between the radii $r_3$ and $r_2$ of the third and second circular arcs is in the range from 1 to 4;

the link radius $r_4$ has the smallest value of all the radii mentioned above;

the distance "q" between the first rectilinear portion and the parallel line, tangent to the second circular arc at the point R of maximum extension of the cavity formed by said curvilinear portion 28, measured perpendicularly to said rectilinear portion, is in the range from 1.5 to 3 mm.

It can be seen in FIGS. 2 and 3 that, in a given centre block, the three different portions 27, 28, 29, for example the portions of the frontal profile in the front of the portion 19 on the right of the equatorial plane, have a sequence which is the inverse, in the axial direction, of that of the three similar portions of the frontal profile in the rear of the corresponding circumferentially adjacent portion of block.

The same geometrical characteristic is repeated for the configuration of the portion 18 of the block on the left of the equatorial plane.

Said characteristic makes it possible to form a cross section widening 30 of curvilinear shape in each branch 22, 23 of the transverse groove of the centre row.

Preferably, said widening is circular in shape.

Preferably, said widening is located in an area substantially equidistant from the ends of each branch of said transverse groove.

The Applicant has found that the curvilinear shape of the cross section widening 30 advantageously maintains a sufficient resistance to both tearing and fatigue in the elastomeric material of the block.

Furthermore, said cross section widening 30 advantageously forms a gripping means which is particularly suitable for trapping snow, as indicated by the hatching in FIG. 2.

Advantageously, each transverse groove of the centre row of the tread band has a further means of trapping snow formed by the aforesaid concavity 26 obtained in the centre of at least one of the two frontal profiles of each block.

Said concavity 26 preferably comprises a closed end with a linear or curvilinear profile, and side walls which are parallel to, or inclined with respect to, the equatorial plane. The side walls of said cavity 26 form the axially inner terminal portions of the frontal profiles of the two axially adjacent portions 18, 19 of each block.

The minimum transverse dimension of said cavity 26, measured perpendicularly to the equatorial plane, is preferably in the range from 7 to 15 mm.

Preferably, the transverse groove between two circumferentially adjacent blocks of the centre row has its point of maximum width, measured parallel to the equatorial plane, lying on the axis of the concavity 26.

Preferably, the ratio between the width of the transverse groove, at the cross section widening 30, and the width of the cavity 26 is in the range from 0.30 to 1. More preferably, said ratio is in the range from 0.40 to 0.90.

The blocks 31 of the lateral rows 20, 21 can have various shapes, provided that they are compatible with the shapes of the blocks of the centre row.

For the purposes of the invention, the most convenient shape of said blocks of the lateral rows is that shown in FIG. 2.

In the embodiment shown in FIG. 2, each block 31 of the shoulder rows 20, 21 is delimited by longitudinal sides 32, 33 parallel to the equatorial plane Y-Y, by transverse sides 34, 35 with a curvilinear profile, and by a curvilinear portion 36 linking the axially inner longitudinal side with one of the transverse sides.

In the example shown in FIG. 2, the curvilinear portion 36 forms a link with the rear transverse side 34.

The shoulder blocks 31 follow each other circumferentially with a predetermined pitch "p"; in a tyre of the aforesaid measure, said value is preferably in the range from 20 to 35 mm.

The centre blocks and the adjacent shoulder blocks 31 are circumferentially staggered with respect to each other by a distance preferably equal to one half of the pitch.

Preferably, as shown in the enlargement in FIG. 3, said staggering is produced in such a way that the curvilinear link 36 between a transverse side and a longitudinal side of a shoulder block 31 faces the curvilinear link 36' formed between a longitudinal side and a transverse side of the centre block.

In FIG. 3, "K" indicates the minimum distance between said circular links 36, 36'.

The design of the centre blocks and of the shoulder blocks is obtained with curvilinear links which make the profiles of said blocks to depart from those of a rhomboidal shape which contain them.

Essentially, as indicated by the hatching in FIG. 3, the aforesaid links 36, 36' remove a quantity of elastomeric material corresponding to the areas 37, 38 from the centre and shoulder blocks.

Advantageously, said design and arrangement of the blocks provides a localized widening of the lateral circumferential grooves 16, 17 and a consequent improvement in the trapping of snow between the blocks, as schematically shown by hatching in the area 39 of FIG. 3.

In order to optimize the grip of the tread band according to the invention on snow-covered ground, each of the centre and shoulder blocks is provided with a plurality of notches, known to those skilled in the art as "sipes".

Preferably, the sipes of the axially adjacent portions 18, 19 of the blocks of the centre row 15 are parallel to each other in each portion, with direction different from the mid-line axes of the corresponding branches 22, 23 of the transverse grooves.

In greater detail, the axially adjacent portions 18, 19 of the centre blocks comprise a plurality of linear sipes 40, parallel to each other in each portion and inclined with respect to the equatorial plane at angles preferably in the range from 15° to 50°.

Preferably, the sipes of the blocks 31 of the shoulder rows 20, 21 have a different profile from that of the corresponding transverse grooves 24, 25.

More particularly, each of the shoulder blocks 31 comprises a plurality of sipes 41 generated by a sequence of three consecutive portions in the shape of a zigzag, with the intermediate portion inclined in the opposite direction to that of the sipes 40 provided in the adjacent portions of the blocks of the centre row 15.

The angle of inclination of the intermediate portions of the sipes 41 with respect to the equatorial plane Y-Y is preferably in the range from 40° to 60°.

The Applicant has found that the orientations of the sipes and of the transverse grooves improve the traction of the tyre according to the invention on snow and do not have an adverse effect on tyre quietness when running on a dry surface.

In order to optimize the grip of the tread band on a snow-covered surface, both the shoulder blocks and the centre blocks can comprise notches 42 located in correspondence of the axially outer longitudinal sides of the shoulder blocks, for example in the proximity of the ends of the sipes of said shoulder blocks.

Preferably, all the shoulder blocks comprise said notches in order to trap snow at the end of each shoulder block.

Said notches are distributed in a substantially uniform way with an orientation which is preferably perpendicular to the equatorial plane of the tyre.

Preferably, the notches 42 have a depth which is lower than the depth of the sipes.

Preferably, the notches 42 have a width which is greater than the width of the sipes.

In an example of embodiment, the notches 42 have a width and a depth of 2 mm. The ratio between the depth of the notches and that of the sipes is 0.25.

Additionally, in order to obtain better traction of the tyre on snow-covered surfaces, the ratio (FIG. 2) between the axial width "$L_c$" of the row of centre blocks 15 and the total width "W" of the tread band, measured between the edges of the tread, is preferably not greater than 0.33.

In a further embodiment of the invention, the blocks 31 of the shoulder row 21 are symmetrically arranged with respect to the blocks 31 of the shoulder row 22; in other words they have an orientation which is rotated through 180° in the plane in which they lie with respect to the orientation of the mirror symmetry arrangement.

The tyre according to the invention has served to decrease the noise of running on a dry surface.

The Applicant considers that one of the factors which may have contributed to the achievement of improved noiseness of the tyre according to the invention may be the particular profile of the transverse sides of the centre blocks.

To provide a better understanding of the possible improvements in terms of quietness, FIG. 5 shows the frontal profile of a conventional block, having a rectilinear profile N, and the frontal profile of a block according to the invention, in the condition in which successive points of the profiles of said blocks touch the ground during the progressive advance of the tyre in the rolling direction H.

The progressive advance of the tyre on the ground is represented by the lines 101-108, which are all located at equal distance from each other.

As shown in FIG. 5, in the case of a block having a profile N of the rectilinear type along its whole transverse extension, portions of identical shape and length progressively come into contact with the ground. Therefore, the frontal profiles in the front of the block strike the ground in succession at a single specific frequency which is a source of noise.

In the case of the invention, on the other hand, it may be noted that the contact with the ground of a portion 18, 19 of the block involves portions of identical inclination and length (for example the portions AB and BC), followed by a portion CD, which differs in both inclination and length from the preceding portions, by a portion DE which has a different inclination from, and is longer than, the preceding ones, followed by a portion EF with a configuration and linear dimension which is greater than the preceding ones and with a profile which is completely different from the preceding ones, and then by a portion FG which is different from and shorter than the preceding one.

Therefore, the Applicant considers it reasonable to assert that the contact with the ground of the transverse side of a block according to the invention does not give rise to a repetitive phenomenon such as that found in the case of a rectilinear profile N according to the prior art.

This could, therefore, be responsible for the improved quietness which has been found in the tread band according to the invention.

The tread band according to the invention can be made with a number of rows of blocks greater than that described above.

For example, in a further embodiment which is not illustrated, the tread band can comprise, in addition to the central row of blocks 15 and to the two lateral shoulder rows 20, 21 (as shown in FIG. 2), two further intermediate rows of blocks, each interposed between the centre row and the shoulder row.

Additionally, the design and arrangement of the blocks of the intermediate rows can be such as to permit the aforesaid localized widening of the circumferential grooves, resulting in improved traction of the tyre on a snow-covered surface, the whole as shown schematically in FIG. 3 with reference to the hatched area 39.

It should also be noted that the blocks of the intermediate rows can have configurations identical to those of the centre row, or could have polygonal profiles different from those described.

The invention claimed is:

1. A tyre for a vehicle wheel, the tyre being configured to be provided on a contact surface, the tyre comprising:
   a carcass structure;
   a belt structure associated coaxially with the carcass structure; and
   a tread band extending coaxially around the belt structure;
   wherein the carcass structure comprises a central crown portion and two axially-opposed sidewalls, wherein the tread band comprises a relief pattern comprising at least one row of blocks separated by transverse grooves intersecting two circumferential grooves, wherein each block of the at least one row is essentially delimited by two longitudinal sides in a circumferential direction of the tyre, wherein each block of the at least one row is essentially delimited by two transverse sides, a front side and a rear side with respect to a predetermined rolling direction of the tyre, wherein each block of the at least one row is formed by two block portions, wherein the two block portions of each block are mirror images of each other, wherein the two block portions are axially adjacent to each other, wherein each of the transverse sides of each block portion comprise at least two successive curvilinear portions shaped differently from each other, wherein the transverse grooves comprise two branches, wherein each branch comprises a widened branch cross-section of substantially-curvilinear shape wherein a junction of the two branches defines a widened junction cross-section, and wherein each widened branch cross-section is disposed in an area substantially equidistant from ends of a respective branch, the widened junction cross-section being wider than the widened branch cross-section.

2. The tyre of claim 1, wherein each block of the at least one row comprises an identical shape.

3. The tyre of claim 1, wherein the at least two successive curvilinear portions comprise a first curvilinear portion, concave toward an inside of a respective block portion, and a second curvilinear portion, with a curvature opposite to that of the first curvilinear portion.

4. The tyre of claim 1, wherein a transverse edge profile of each block portion comprises two successive curvilinear portions whose shape lean inverse of two successive curvilinear portions of a facing transverse edge profile of a circumferentially-adjacent block portion.

5. The tyre of claim 1, wherein an edge profile of each of the transverse sides comprises a rectilinear portion followed by the at least two successive curvilinear portions.

6. The tyre of claim 5, wherein each block portion is contained in one of two axially-adjacent rows of rhombuses, and wherein each rectilinear portion is inclined at an angle greater than or equal to 55° and less than or equal to 70° with respect to an equatorial plane of the tyre.

7. The tyre of claim 5, wherein the at least two successive curvilinear portions compile a first curvilinear portion, concave toward an inside of a respective block portion, and a second curvilinear portion, with a curvature opposite to that of the first curvilinear portion.

8. The tyre of claim 7, wherein the first curvilinear portion is a parabolic arc, and wherein the second curvilinear portion is also a parabolic arc.

9. The tyre of claim 5, wherein the at least two successive curvilinear portions comprise a first curvilinear portion and a second curvilinear portion, wherein the first curvilinear portion comprises a first circular arc and a second circular arc, wherein the second curvilinear portion comprises a third circular arc, wherein a radius of the first circular arc is greater than a radius of the second circular arc, and wherein a radius of the third circular arc is greater than the radius of the second circular arc.

10. The tyre of claim 9, wherein the first curvilinear portion forms a concavity, and wherein a perpendicular distance between the rectilinear portion and a line both parallel to the rectilinear portion and tangent to the concavity is greater than or equal to 1.5 mm and less than or equal to 3 mm.

11. The tyre of claim 9, wherein a ratio of the radius of the first circular arc to the radius of the second circular arc is greater than or equal to 1 and less than or equal to 6.

12. The tyre of claim 9, wherein a ratio of the radius of the third circular arc to the radius of the second circular arc is greater than or equal to 1 and less than or equal to 4.

13. The tyre of claim 9, wherein the second circular arc and the third circular arc are linked together by a fourth circular arc, wherein a radius of the fourth circular arc is less than the radius of the first circular arc, wherein the radius of the fourth circular arc is less than the radius of the second circular arc, and wherein the radius of the fourth circular arc is less than the radius of the third circular arc.

14. The tyre of claim 1, wherein the two block portions of each block are symmetrical.

15. The tyre of claim 1, wherein the two block portions of each block are joined together.

16. The tyre of claim 1, wherein the two block portions of each block are separated by a sipe.

17. The tyre of claim 1, wherein a central longitudinal axis of each block is aligned on an equatorial plane of the tyre.

18. The tyre of claim 1, wherein the block portions are essentially rhombus-shaped.

19. The tyre of claim 18, wherein a longer diagonal of the essentially rhombus-shaped block portions forms an angle greater than or equal to 25° and less than or equal to 55° with respect to an equatorial plane of the tyre.

20. The tyre of claim 18, wherein longer diagonals of axially-adjacent block portions converge symmetrically with respect to a central longitudinal axis of each block.

21. The tyre of claim 1, wherein the block portions are essentially rhomboid-shaped.

22. The tyre of claim 21, wherein a longer diagonal of the essentially rhomboid-shaped block portions forms an angle greater than or equal to 25° and less than or equal to 55° with respect to an equatorial plane of the tyre.

23. The tyre of claim 21, wherein longer diagonals of axially-adjacent block portions converge symmetrically with respect to a central longitudinal axis of each block.

24. The tyre of claim 1, wherein axially-outer longitudinal sides of each block portion are parallel to an equatorial plane of the tyre.

25. The tyre of claim 1, wherein each block portion is contained in one of two axially-adjacent rows of parallelograms, wherein axially-inner longitudinal sides of the parallelograms are parallel to an equatorial plane of the tyre, wherein axially-outer longitudinal sides of the parallelograms are parallel to the equatorial plane of the tyre, wherein, in each axially-adjacent row of parallelograms, transverse sides of the parallelograms are parallel to each other, wherein transverse sides of axially-adjacent parallelograms converge toward the equatorial plane of the tyre, and wherein the transverse sides of the parallelograms partially coincide with transverse edge profiles of the block portions.

26. The tyre of claim 25, wherein, for each parallelogram, a ratio of a length of a shorter diagonal to a length of a longer diagonal is greater than or equal to 0.5 and less than or equal to 0.7.

27. The tyre of claim 1, wherein each transverse groove comprises a concavity in at least one transverse edge profile of two respective circumferentially-adjacent blocks, and
wherein each concavity is disposed in a center of the respective transverse groove.

28. The tyre of claim 1, wherein each transverse groove comprises a concavity in at least one transverse edge profile of two respective circumferentially-adjacent blocks, and
wherein each concavity straddles an equatorial plane of the tyre.

29. The tyre of claim 1, further comprising two rows of shoulder blocks,
wherein a first row of shoulder blocks is disposed between a first circumferential groove and a first edge of the tread band,
wherein a second row of shoulder blocks is disposed between a second circumferential groove and a second edge of the tread band,
wherein the shoulder blocks of the first row are separated from each other by first lateral transverse grooves, and
wherein the shoulder blocks of the second row are separated from each other by second lateral transverse grooves.

30. The tyre of claim 29, wherein the blocks of the at least one row and the shoulder rows comprise sipes.

31. The tyre of claim 30, wherein each sipe in a block portion is parallel to each other sipe in the block portion.

32. The tyre of claim 30, wherein, on a first side of an equatorial plane of the tyre, the sipes in each block portion are parallel to each other, and
wherein, on a second side of the equatorial plane of the tyre, the sipes in each block portion are parallel to each other.

33. The tyre of claim 30, wherein, with respect to an equatorial plane of the tyre, the sipes of a first block portion are inclined in an opposite direction to the sipes of an axially-adjacent second block portion.

34. The tyre of claim 30, wherein, with respect to an equatorial plane of the tyre, the sipes of each block portion are inclined in an opposite direction to the transverse sides of the block portion.

35. The tyre of claim 30, wherein the blocks of the shoulder rows comprise zigzag-shaped sipes.

36. The tyre of claim 30, wherein the sipes of the block portions and the sipes of the blocks of the shoulder rows comprise essentially a same depth.

37. The tyre of claim 30, wherein the sipes of the block portions, the sipes of the blocks of the shoulder rows, the circumferential grooves, and the transverse grooves comprise essentially a same depth.

38. The tyre of claim 30, further comprising notches; wherein depths of the notches are smaller than depths of the sipes.

39. The tyre of claim 38, wherein a ratio of the depths of the notches to the depths of the sipes is 0.25.

40. The tyre of claim 29, wherein, with respect to an equatorial plane of the tyre, the blocks of the first and second shoulder rows are arranged symmetrically.

41. The tyre of claim 29, wherein a shape of the blocks of the first shoulder row is a mirror image of a shape of the blocks of the second shoulder row.

42. The tyre of claim 29, wherein each block of the shoulder rows is delimited by longitudinal sides that are parallel to an equatorial plane of the tyre,
wherein each block of the shoulder rows is delimited by two transverse sides with curvilinear profiles, and
wherein each block of the shoulder rows is delimited by a curvilinear linking profile between an axially-inner longitudinal side and a rear transverse side with respect to the predetermined rolling direction of the tyre.

43. The tyre of claim 29, wherein curvilinear profiles of the at least one row of blocks and the first row of shoulder blocks are arranged opposite each other along the first circumferential groove, producing a widening of the first circumferential groove, and
wherein curvilinear profiles of the at least one row of blocks and the second row of shoulder blocks are arranged opposite each other along the second circumferential groove, producing a widening of the second circumferential groove.

44. The tyre of claim 1, wherein a ratio of an axial width of the at least one row of blocks to a width of the tread band measured between edges of the tread band is less than or equal to 0.33.

45. The tyre of claim 1, wherein the tread band comprises a relief pattern comprising a row of center blocks, two rows of intermediate blocks, and two rows of shoulder blocks,
wherein a first row of shoulder blocks is disposed between a first edge of the tread and a first circumferential groove,
wherein a first row of intermediate blocks is disposed between the first circumferential groove and a second circumferential groove,
wherein the row of center blocks is disposed between the second circumferential groove and a third circumferential groove,
wherein a second row of intermediate blocks is disposed between the third circumferential groove and a fourth circumferential groove,
wherein a second row of shoulder blocks is disposed between the fourth circumferential groove and a second edge of the tread,
wherein the shoulder blocks of the first row are separated from each other by first transverse grooves,
wherein the intermediate blocks of the first row are separated from each other by second transverse grooves,
wherein the block portions are separated from each other by third transverse grooves,
wherein the intermediate blocks of the second row are separated from each other by fourth transverse grooves, and
wherein the shoulder blocks of the second row are separated from each other by fifth transverse grooves.

46. The tyre of claim 45, wherein, in a row of intermediate blocks, each block comprises an identical shape.

* * * * *

UNITED STATES PATENT AND TRADEMARK OFFICE
CERTIFICATE OF CORRECTION

PATENT NO. : 7,270,163 B2  Page 1 of 1
APPLICATION NO. : 10/469026
DATED : September 18, 2007
INVENTOR(S) : Colombo et al.

It is certified that error appears in the above-identified patent and that said Letters Patent is hereby corrected as shown below:

Claim 4, column 11, line 38, "lean" should read --is an--.

Claim 7, column 11, line 51, "compile" should read --comprise--.

Signed and Sealed this

Twenty-seventh Day of May, 2008

JON W. DUDAS
*Director of the United States Patent and Trademark Office*